United States Patent [11] 3,580,439

[72] Inventors Lawrence A. Jewett
17383 Greenbrier Drive, Strongsville, Ohio 44136;
Walter C. Jewett, Box 245 Gripps Road, Willington, Ohio 44090
[21] Appl. No. 804,243
[22] Filed Mar. 4, 1969
[45] Patented May 25, 1971

[54] VEHICLE LUGGAGE CARRIER
8 Claims, 5 Drawing Figs.
[52] U.S. Cl. ..................................... 224/42.1, 312/107
[51] Int. Cl. .................................... B60r 9/04
[50] Field of Search........................... 224/42.1 (A), 42.1 (D), 42.1 (E); 312/107, 334, 335

[56] References Cited
UNITED STATES PATENTS
2,812,992 11/1957 Lysen ........................ 224/42.1(E)X
3,008,784 11/1961 Allard ......................... 224/42.1(E)X
3,082,050 3/1963 Baxter et al. ................. 312/335X
3,113,819 12/1963 Bessette ...................... 224/42.1(E)X FOREIGN PATENTS
696,362 10/1930 France ....................... 224/42.1(E)

Primary Examiner—Gerald M. Forlenza
Assistant Examiner—Frank E. Werner
Attorney—Fay, Sharpe and Mulholland ABSTRACT: A vehicle top luggage carrier having a container removably fastened to the top of a vehicle. The container has a top, bottom, sides and an opening in front and back to permit access to the inside of the container. Hinged doors cover the openings. Drawer shells are slidably received through the openings in the container and themselves have a top, bottom and sides. The front and back of the shells are open to permit drawers to be slidably received in the drawer shells. Depressions on the top of the shells and complementary projections on the bottom of the shells permit them to be stacked and interfitted in a vertical position.

PATENTED MAY 25 1971 3,580,439

INVENTORS
LAWRENCE A. JEWETT
WALTER C. JEWETT
BY
*Fay, Sharpe & Mulholland*
ATTORNEYS INVENTORS
LAWRENCE A. JEWETT
WALTER C. JEWETT
BY
Fay, Sharpe & Mulholland
ATTORNEYS

VEHICLE LUGGAGE CARRIER

BACKGROUND OF THE INVENTION

On camping trips motorists often attach removable vehicle luggage carriers to the top of their automobiles. These luggage carriers usually have an opening at their front which coincides with the side of the automobile. While it would be convenient to have access to the luggage in the carrier from either side of the vehicle, only one door is usually provided. It is therefore often necessary to walk all the way around the vehicle to gain access to the luggage through the single door in the carrier.

While camping, it is often prudent to leave some clothing, camping gear or other materials in the luggage carrier where they are relatively safe. However, it is very inconvenient to use the luggage carrier on the vehicle as a regular place of storage because of the difficulty encountered in gaining access to it. That is, the relatively elevated position of the carrier makes the removal of items awkward. It is often necessary to stand on the edge of the door sill in order to see the contents of the carrier. Moreover, the items near the front of the carrier must always be shifted around or removed to reach items at the rear.

While it is possible to remove the luggage carrier from the top of the vehicle, it is usually relatively difficult to do so. The entire luggage carrier, of course, is a very bulky item and usually relatively heavy. It would normally take at least two and possibly three individuals to remove the luggage carrier without damaging it or the vehicle.

Even if the luggage carrier should be removed from the vehicle, it is still somewhat inconvenient to use as a regular place of storage while camping. The carrier takes a relatively large amount of space in a tent. It would still be also difficult to gain access to the material in the luggage carrier since it is always necessary to operate through the side opening. Moreover, the unpleasant task of replacing the luggage carrier on the vehicle after a camping trip must necessarily follow its removal.

This invention provides a vehicle top luggage carrier which is convenient to pack and unpack and is particularly useful on camping trips. This luggage carrier includes a container having a top, bottom, sides and hinged doors over openings at the front and back. The container is attached through some conventional means to the vehicle. Slidably received in the container are shells having a top, bottom, sides and openings at the front and back. Inside the shells are drawers which are slidable in and out of the shells.

The shells with their respective drawers are constructed so that they may be entirely removed from the container, stacked and interfitted in a vertical position with each other. When they are thus stacked, the result is, in effect, a bureau of drawers. Because of the removable shells and drawers, this luggage carrier is extremely easy to pack. The individual shells with their accompanying drawers may be removed from the container and packed individually. Because the individual drawers and shells are necessarily smaller and lighter than the entire container, they can therefore be more easily handled.

This luggage carrier is particularly useful on camping trips. The shells and container drawers may either individually or collectively be removed depending on what portion of their contents is desired. They may be subsequently stacked, interfitted and used as a bureau of drawers or they may be individually used in different locations. Since the shells may be stacked vertically, they take up less floor space in the relatively limited area of a tent. The subsequent reloading of the luggage container on the vehicle will also be extremely convenient due to the fact that individual shells with their drawers can be lifted and put in place.

If desired, the shells may have guides which interact with lips on the side of the shells to facilitate the sliding of the drawer in the shell. A lip may also be placed at the front of the drawer to act as a handle.

A vehicle luggage carrier including a container which has a top, bottom, sides and at least one door opening to permit access to the inside of the container. At least one drawer shell is slidably received in the container through the opening therein. The drawer shell has a top, bottom, sides and an opening to slidably receive a drawer.

DESCRIPTION OF THE DRAWINGS

As seen in FIGS. 1—5, this invention contemplates a vehicle luggage carrier 10 which includes a container 11 having a top 12, sides 14 and a bottom (not illustrated). The front and rear of the container 11 have openings covered by doors 16 which are pivotally mounted along their top edge by a hinge 18. The doors 16 are basically rectangular and normally have a lock 20 to permit them to be secured in a closed position.

Figure 1:
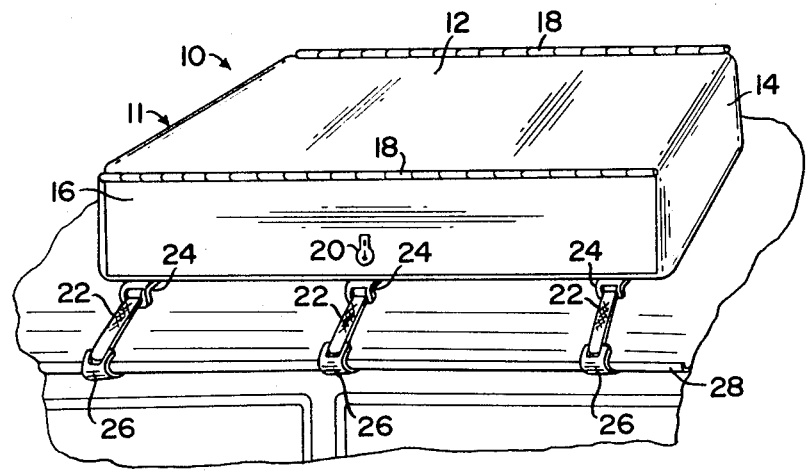
FIG. 1 is a perspective view of the luggage carrier of this invention as mounted on top of a vehicle.

The container may be attached to the vehicle in any conventional manner. One satisfactory way is that illustrated in FIG. 1 where straps 22 have one end connected to brackets 24 which are integral with the container 11. The other end of the straps 22 is connected to a second set of brackets 26 which clamp onto a vehicle rail 28.

Figure 2:
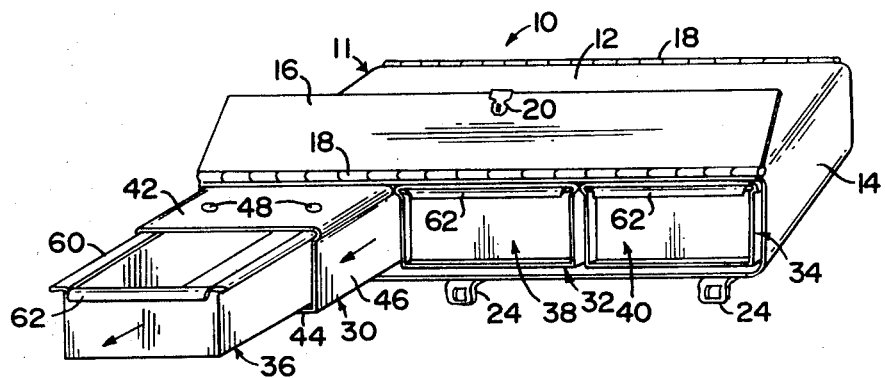
FIG. 2 is a perspective view of the open luggage carrier and a partially withdrawn shell and drawer.
Figure 3:
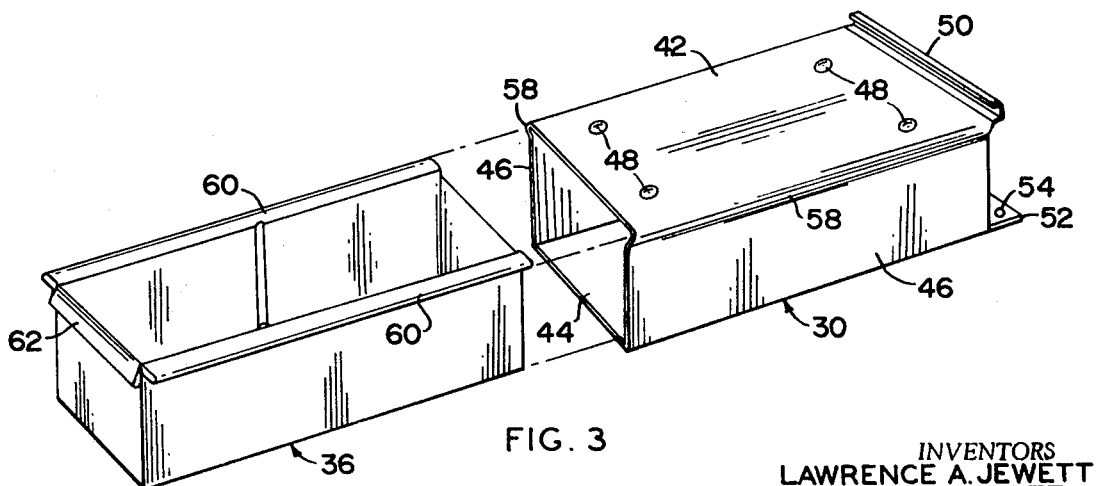
FIG. 3 is a perspective view of the interfitting drawer and shell used in the container.

As particularly noted in FIG. 2, there are three shells 30, 32 and 34 containing drawers 36, 38 and 40 respectively. Of course, the number of shells and drawers may vary according to their size but they are generally rectangular in cross section and tubular in order to fit inside the container and utilize the maximum amount of space. The shell 30 has a top 42, bottom 44, sides 46 and openings at the front and rear. There are indentations 48 on the top 42 of the shell 30 and a restraining bracket 50 along the rear edge of the top 42. The bracket 50 is generally a forwardly facing U-shaped projection which extends above the plane of the top 42. The bracket 50 interfits with a rearwardly projecting extension 52 at the rear of the bottom 44. The extension 52 also has apertures 54 which may be utilized to secure the bottommost shell to the ground by driving a post through the apertures 54.

The indentations 48 cooperate with complementary projections 56 at the bottom of every shell in order to interfit the shells when they are vertically stacked. Moreover, the combination of the restraining bracket 50 and extension 52 stops any sliding movement of one shell off the back of another.

The top 42 of the shell 30 extends outwardly slightly beyond the plane of the sides 46 before turning inwardly to connect with the sides 46. The resulting bulbous projections form guides 58 which act in conjunction with lips 60 on the drawer 36. In this way the drawer may be carried and guided within the shell by the cooperation of the lip 60 with the rounded inner wall of the guide 58. A lip 62 is provided at the front of the drawer and acts as a handle by which the drawer 36 may be withdrawn from the shell 30. The interaction of the guide 58 and lip 60 can be particularly noted in FIG. 5.

The shells and drawers are usually constructed of molded plastic which is impervious to moisture.

Figure 4:
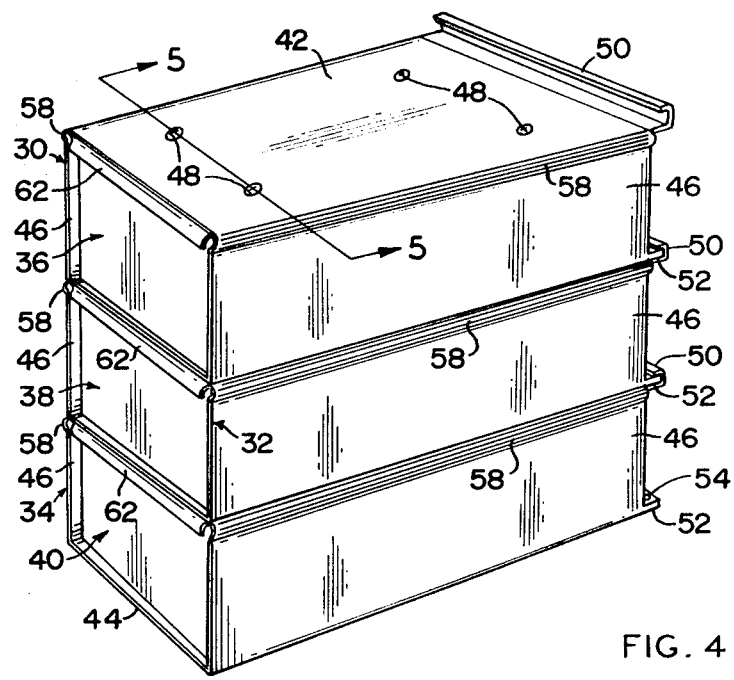
FIG. 4 is a perspective view of the vertically stacked shells containing the drawers.
Figure 5:
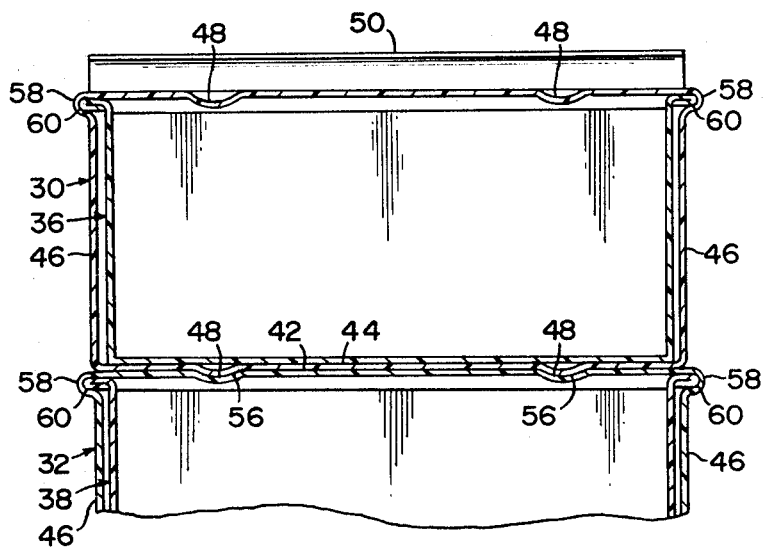
FIG. 5 is a sectional taken through 5-5 of FIG. 4 and indicates a partially cutaway cross section through the shells and drawers.

In use, the shells may be stacked vertically as shown in FIGS. 4 and 5. When so stacked, the indentations 48 on the top of every shell interfit with the complementary projections 56 at the bottom of every shell. This use of interfitting indentations and projections allows the shells to be stacked in any sequence while preventing sliding between them. The bracket 50 and extension 52 at the back of the shells also act to restrain a higher shell from sliding off the back of a lower supporting shell. This is particularly important when a drawer is pushed into its shell. Without this restraining means the drawer and shell would have a tendency to slide off their lower supporting shell.

It is obvious that this invention provides an extremely convenient device for storing clothing or equipment. Moreover, this invention through its unique use of shells and drawers in a container allows luggage to be packed, unpacked, stored and stacked with the utmost convenience to the user.

For ease of description, the principles of this invention have been set forth in connection with but one illustrated embodiment. It is not intended that the illustrated embodiment nor the terminology employed in describing it be limiting inasmuch as variations may be made without departing from the spirit of the invention. Rather it is desired to be restricted only by the scope of the appended claims.

We claim:

1. Vehicle luggage carrier comprising:
a container having a top, bottom, side and an opening to permit access to the inside of the container;
a door covering the opening in the container;
a plurality of shells slidably received in the container through the opening therein;
the drawer shells having openings which generally coincide with the opening in the container;
interfitting drawers in the shells;
means to interfit the shells in a vertical position;
means for withdrawing the drawers from the shells; and
means for fastening the container to the top of the vehicle.

2. The vehicle top carrier of claim 1 wherein there is a means to restrain relative horizontal movement of the shells when interfitted on top of each other.

3. The vehicle top carrier of claim 2 wherein the means to interfit includes at least one depression on a surface of a first shell and a complementary projection on a surface of a second shell, the surfaces of the first and second shell being in contact with one another when the shells are stacked.

4. The car top carrier of claim 3, wherein the shells have guides along the inner walls which interact with lips in the outer edges of the drawers.

5. The vehicle top carrier of claim 4, wherein the means to restrain horizontal movement of a lower and upper shell includes an upwardly extending flange on the top rear portion of the lower shell and an outwardly projecting complementary extension on the bottom of the rear of the upper shell which engages the flange.

6. The car top carrier of claim 5, wherein the means for withdrawing the drawer includes a handle on the front thereof.

7. The vehicle top carrier of claim 6, wherein there is an opening on both sides of the container with complementary hinged doors so that the drawers and drawer shells are accessible from either side of the vehicle.

8. The vehicle top carrier of claim 7, wherein the means for fastening the container to the top of the vehicle includes straps having one end attached to the container and the other end of the strap engaging a part of the vehicle.